May 16, 1933.   G. G. ROSINO   1,909,870
CONTROLLER FOR AUTOMOBILE HEATERS
Filed July 18, 1930
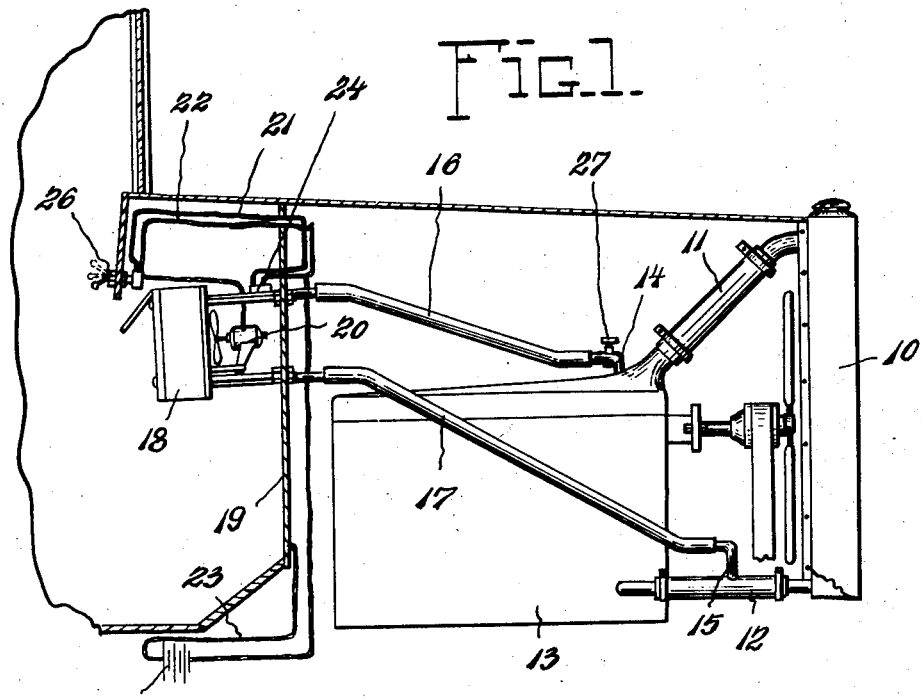
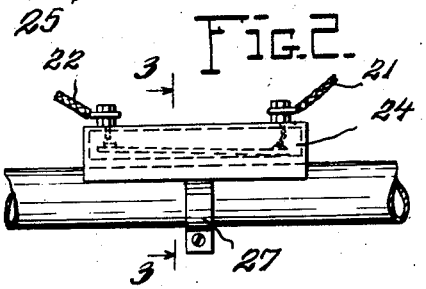
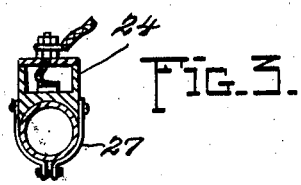
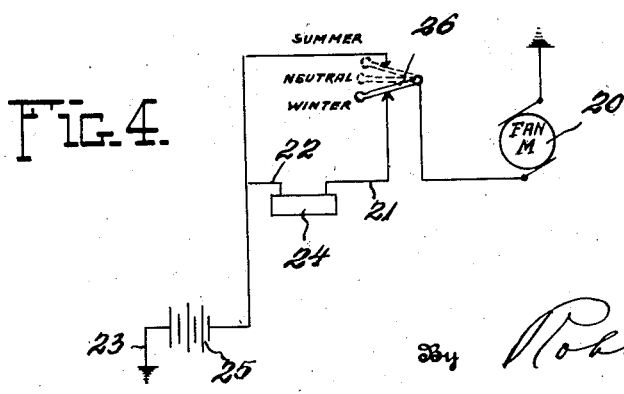
Inventor
G. G. Rosino
By Robert Robb
Attorneys Patented May 16, 1933

1,909,870

UNITED STATES PATENT OFFICE

GILBERT G. ROSINO, OF SANDUSKY, OHIO

CONTROLLER FOR AUTOMOBILE HEATERS

Application filed July 18, 1930. Serial No. 468,928.

The present invention relates to a heating system of a type especially adapted to heat the interior of a motor vehicle, and more specifically relates to a type of heater in which the source of heat is hot water drawn from the water jacket of the engine, although it will be apparent that the heater may use the heat from the exhaust of the vehicle, or any other kind of heating fluid which may be convenient and available.

Yet more specifically the invention deals with a control for the circulating means customarily associated with this type of heater, the circulating means customarily comprising a fan or blower, or equivalent circulating means, for passing air about the heater to direct the heat therefrom into the interior of the space to be heated.

The control of the present invention assures the automatic stopping and starting of the blower or other heat disseminator through the influence of temperature changes of predetermined ranges occurring in the heating fluid, thus avoiding exhaustion of the source of power to the blower in the event that the blower is not turned off manually when the engine of the vehicle is stopped.

The present invention provides a control which is in the nature of a self-acting thermostatic switch included in a circuit which also comprises a source of power, such for example, as a battery and the circulating means, there being also provided in the circuit a manual switch by which the thermostatic switch and blower, or either, may be cut into and out of the circuit as desired.

It will be understood that since the automatic switch is temperature controlled, the circulating means will not operate until the source of heat has reached a predetermined temperature through the running of the motor, and that the circulating means will then continue to operate until the source of heat has cooled, through the stopping of the engine, to the point where the automatic switch will respond to stop the circulating means.

The invention will be more clearly understood by reference to the accompanying drawing, in which—

Figure 1 illustrates in a diagrammatic view an application of this invention.

Figure 2 is a detailed view of the control unit attached to a section of a water pipe, through which hot water passes.

Figure 3 is a sectional view on the line 3—3 of Figure 2, and

Figure 4 is a diagrammatic arrangement showing a circuit in which the control is placed.

In the drawing 10 represents the usual radiator construction having the pipes 11 and 12 connecting the front of the radiator with the usual water jackets around the engine 13.

Pipes 11 and 12 are provided with connections 14 and 15 respectively, to which connections are secured pipes 16 and 17 respectively, which may be simply pieces of rubber hose, these pipes leading to the heater 18 mounted on the dashboard 19, and under the cowl, where it is out of the way.

Adjacent the heater 18 is a fan or blower 20 arranged to blow heat from the heater into the interior of the vehicle, the fan being controlled by the conductors 21, 22, and 23, a thermostat 24 being placed in thermal contact with the heating line leading to the heater 18. This thermostat is conveniently of the known bi-metallic type, and in itself forms no part of this invention. The supply of current to the fan 20 is illustrated by the battery 25, a three-way switch 26 being included in the fan circuit. One terminal in the fan is ground and one side is battery and is also ground, as clearly shown in Figures 1 and 4.

It will be seen that the thermostat 24 is conveniently secured in direct contact with the heating line by means of a clamp 27 or any other convenient fastening means.

It will therefore be seen that when hot water circulates through the system, the heater 18 operates to warm the interior of the vehicle, and when the temperature of the fluid circulating through the heater 18 reaches a predetermined amount, the thermostat 24 will operate to close the circuit through the fan, which fan will operate until the temperature has fallen approximately to the temperature at which the fan started to operate, this control eliminating all danger of running down the battery 25 due to neglect in shutting off the same manually.

In Figure 4 it will be seen that the switch 26 may be operated to cut out both the fan and the thermostat by moving the switch to "neutral" position, and that by moving the switch over to the position indicated as "summer" the fan will continue to operate while the thermostat will be cut out from the circuit. It will also be seen that there is provided a valve 27 for cutting off the flow of heating fluid to the heater when desired, so that with the valve 27 closed the heater 18 will have no effect and accordingly the fan 20 can be used only as a ventilating medium.

It will be understood that the above specifically illustrated and described adaptation of this invention is only illustrative of one way in which the invention can be applied. It is evident that many changes in the details thereof can be made without departing from the spirit of the invention, and it is accordingly understood that it is intended and desired to embrace within the scope of this invention such modifications and changes as may be adapted to varying conditions and uses.

Having thus described my invention, what I claim as new and desire to secure by Letters Patent of the United States, is—

1. In a water heating system for motor vehicles, the combination with an internal combustion engine including a water-cooling system therefor, of a heater having a water circulation from said water cooling system, and circulating means associated with said heater for passing air about the same, said circulating means being included in an electric circuit having a source of current therein for operating the circulating means, an automatically operating temperature responsive element in thermal contact with the water circulation for the heater, the said element directly controlling the circulating means aforesaid, and switch means under control of the operator for rendering the temperature responsive element inoperative and directing flow of the current to the circulating means independently of said element.

2. In a water heating system for motor vehicles, the combination with an internal combustion engine including a water cooling system, of a heater having a water circulation from said water cooling system, a fan for circulating air about the heater for distributing the heat therefrom, means for cutting off the water circulation to the heater, a thermostat in thermal contact with the water system to the heater and controlling the fan during the circulation of the heating fluid in said heater circulation system, and a manually operable switch adapted to control the operation of the fan independently of the thermostat.

3. In a water heating system for motor vehicles, the combination with an internal combustion engine including a water cooling system, of a heater having water circulation from said water cooling system, means for circulating the heat from said heater through the automobile, main and auxiliary control means for said circulating means included in a suitable electric circuit, the main control means comprising a thermostatic switch responsive to temperature changes in the water system of the heater for directly controlling the operation of the circulating means, the auxiliary control means being independent of the main control and comprising a manually controllable switch for rendering the main control means inoperative and directing flow of current to the heat circulating means aforesaid.

4. In a water heating system for motor vehicles the combination with an internal combustion engine including a water cooling system, of a heater having a water circulation from said water cooling system, a fan associated with the heater for distributing heat therefrom into the automobile, main control means operated by temperature changes in the heating fluid for automatically and directly controlling the fan responsive to said temperature changes, manually operable auxiliary control means for effecting operation of the fan independently of the main control means, and means for controlling the passage of water into the water circulating system for the heater when the fan is operated under said manual control.

In testimony whereof I affix my signature.

GILBERT G. ROSINO.